Oct. 19, 1926.
M. E. EDWARDS
CAKE SLICER
Filed April 10, 1926
1,603,941
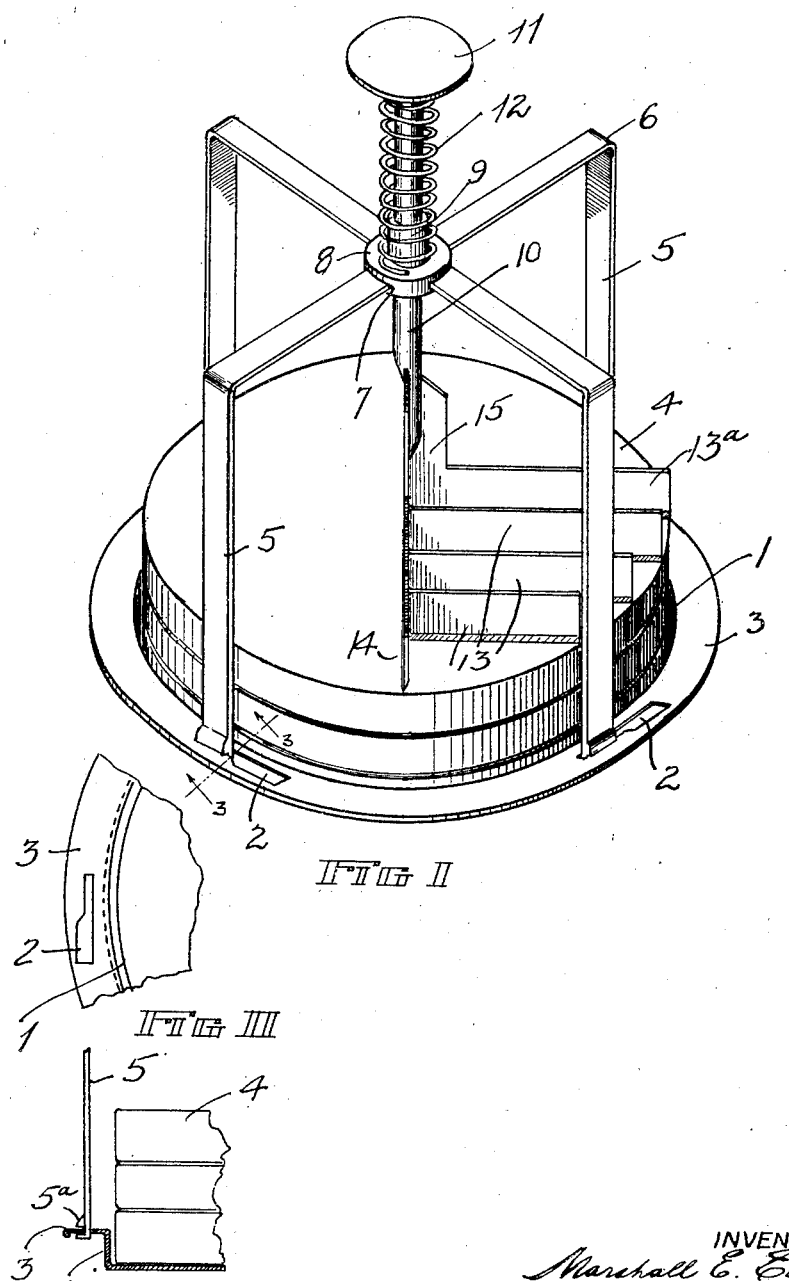
INVENTOR
Marshall E. Edler
BY
ATTORNEY Patented Oct. 19, 1926.

1,603,941

UNITED STATES PATENT OFFICE.

MARSHALL E. EDWARDS, OF CASSEL, CALIFORNIA.

CAKE SLICER.

Application filed April 10, 1926. Serial No. 101,075.

My invention relates to a new and useful cake or the like cutting device and has for its primary object to provide a device of this character which is adapted for use in the home, hotels, restaurants, or any place where cakes are to be cut or sliced.

In its preferred form the device offers a simple and cheaply constructed device which can be conveniently used for slicing or dividing cakes or portions thereof into even slices without waste.

In the accompanying drawing I have illustrated the application of the invention including the details of construction of the preferred form. I wish it to be understood that this showing is simply illustrative, as I may make certain changes without departing from the spirit of the invention, as pointed out in the subjoined claims.

In the drawings, Fig. 1 is a perspective view of the device; Fig. 2 is a detail view in plan of a marginal portion of the base of the device; and Fig. 3 is a sectional view on the line 3—3 Fig. 1.

Referring to the drawing in detail, 1 represents a circular pan like base having keyhole slots 2 punched, or otherwise formed, in the elevated and outwardly extended flange 3 thereof.

Connected to the pan 1 through the medium of the keyhole slots 2 are a plurality of uprights 5, the same being preferably four in number, and each one being bent as at 6, and extended horizontally over the pan. The confronting ends of these horizontal extensions are received in slots 7 in a center disk 8 which is centered in respect to the center of the pan 1.

Projecting through a sleeved opening 9 in the disk 8 with freedom of rotation and reciprocation is a rod or the like 10, the same having a flat head 11 on its upper end to receive hand pressure for pushing the rod downwardly. Coiled around the rod between the disk 8 and the head 11 is a spring 12 which is adapted to return the rod to elevated or normal position after it has been forced downwardly.

Mounted to the lower end of the rod is the cutting or slicing means, which comprises a plurality of vertically disposed parallel blades 13 of varying length. These blades 13 are mounted to a blade 14 and from which they extend at right angles. The longest parallel blade $13^a$ forms a V-shaped connection with the blade 14 and provides means for quartering the cake, while the other blades 13 cut or slice the quarter into four pieces of uniform thickness. The vertical angular web 15 provides a convenient means of connecting the cutting device to the rod 10.

In making this cutting or slicing device I can conveniently use sheet metal, and after it is cut or stamped into the proper design it may then be bent to form the blade $13^a$ and the blade 14. The blades 13 can then be separately formed and welded or otherwise attached to the blade 14.

In using the device the uprights are detached from the pan by turning or sliding them so as to present the lugs $5^a$ in the enlarged ends of the keyhole slots 2, then the entire frame may be removed from the pan. The cake to be cut is then set in the pan and the frame replaced. The cutting or slicing device may now be operated by pressing upon the head 11, which will force the blades into the cake and slice a quarter of the cake in a plurality of pieces in one operation. When thus quartered and sliced the cutting device may be rotated to slice another quarter and so on until the entire cake is sliced.

The blade 14 and the blade $13^a$ will ordinarily be made as high, or higher, as the cake is thick so that they will cover the exposed quartered cut and keep the remainder of the cake fresh.

I claim:

1. A cake or the like slicer, comprising a base upon which the cake is supported, a frame connected to and extending over the base, a rod mounted to the frame with freedom of reciprocation and rotation, said rod being centered with respect to the base, and means connected to the lower end of the rod for quartering the cake and dividing the quarters in slices of uniform thickness.

2. A cake or the like slicer, comprising a base upon which the cake is supported, a frame connected to and extending over the base, a rod mounted to the frame with freedom of reciprocation and rotation, said rod being centered with respect to the base, and means connected to the lower end of the rod for quartering the cake and dividing the quarters in slices of uniform thickness, said means comprising a pair of right angle blades and a plurality of parallel blades connected to one of said first mentioned blades and extending at an angle therefrom.

3. A cake or the like slicer, comprising a pan upon which the cake is supported, a frame detachably connected to and extending over said pan, said frame comprising a plurality of upright members bent to extend over the pan, a center disk having slots in its sides to receive the ends of said bent members, an opening in said disk, a rod projecting through said opening adapted to be reciprocated and rotated with respect to the disk, a head on the upper end of the rod, a spring coiled around the rod between the disk and head for maintaining the rod normally elevated, and a cake slicing device carried by the lower end of the rod, said slicing device comprising a pair of right angle blades and a plurality of parallel blades connected to one of said right angle blades and extending at an angle therefrom, said right angle blades adapted to cut the cake in quarters and said parallel blades adapted to divide the quartered portions in slices of uniform thickness.

Signed at Cassel, California, this 8 day of March, 1926.

MARSHALL E. EDWARDS.